United States Patent [19]

Roy et al.

[11] Patent Number: 4,712,672

[45] Date of Patent: Dec. 15, 1987

[54] HAY BALE COVER

[76] Inventors: George N. Roy, 401 W. North, Apt. B, Warrensburg, Mo. 64093; James Roy, Rte. 1, Spickard, Mo. 64679

[21] Appl. No.: 871,554

[22] Filed: Jun. 6, 1986

[51] Int. Cl.⁴ .............................................. B65D 71/00
[52] U.S. Cl. ........................................ 206/83.5; 52/3; 150/52 R
[58] Field of Search .................. 52/3, 4; 150/52 R; 206/83.5, 442; 383/907

[56] References Cited

U.S. PATENT DOCUMENTS

| | | |
|---|---|---|
| 535,751 | 3/1895 | Campbell . |
| 557,011 | 3/1896 | Murray .................. 150/52 R |
| 672,282 | 4/1901 | Munford . |
| 783,811 | 2/1905 | Allen ..................... 150/52 R |
| 983,492 | 2/1911 | Harriss . |
| 2,635,562 | 4/1953 | Abramson . |
| 2,689,678 | 9/1954 | Wendt . |
| 2,705,557 | 4/1955 | Hartman . |
| 2,713,370 | 7/1955 | Quinn . |
| 2,851,078 | 9/1958 | Mellon et al. ........... 150/52 R |
| 2,959,278 | 11/1960 | Mitchell et al. .......... 150/52 R |
| 3,022,808 | 2/1962 | Silver . |
| 3,405,863 | 10/1968 | Kugler . |
| 3,427,790 | 2/1969 | Flittie . |
| 3,674,073 | 7/1972 | Hendon . |
| 3,674,139 | 7/1972 | Manasian et al. . |
| 3,797,650 | 3/1974 | O'Brien et al. . |
| 4,132,257 | 1/1979 | Filosa . |
| 4,221,085 | 9/1980 | Conaghan . |
| 4,248,343 | 2/1981 | Schaefer . |
| 4,257,200 | 3/1981 | Hensley et al. . |
| 4,320,701 | 3/1982 | Donaldson . |
| 4,366,949 | 1/1983 | Staub, Sr. . |
| 4,538,385 | 9/1985 | Kandarian ..................... 52/3 |

FOREIGN PATENT DOCUMENTS

| | | | |
|---|---|---|---|
| 0313720 | 5/1956 | Switzerland ............................ 52/3 |
| 2026056 | 1/1980 | United Kingdom ................... 52/3 |

Primary Examiner—Jimmy G. Foster
Attorney, Agent, or Firm—Litman, McMahon & Brown

[57] ABSTRACT

Disclosed is a reusable waterproof cover of durable plastic film shaped to enclose substantially a large, cylindrical hay bale and having a semicircular top portion with side portions extending generally downwardly therefrom and spaced apart a distance approximately the diameter of a bale to be covered. Opposite end members having an inverted U-shape are connected to the top portion and have lower portions extending between the side portions, whereby the cover fits over the bale with the side and end lower portions tucked inwardly of a reposed bottom of the bale and forming a fold or flap therearound. A tie extends around the bottom of the bale and is received in the fold or flap for drawing the cover securely over the bale. A plurality of slits in the end members permit circulation of air therethrough to aid in keeping the hay in good condition.

10 Claims, 3 Drawing Figures

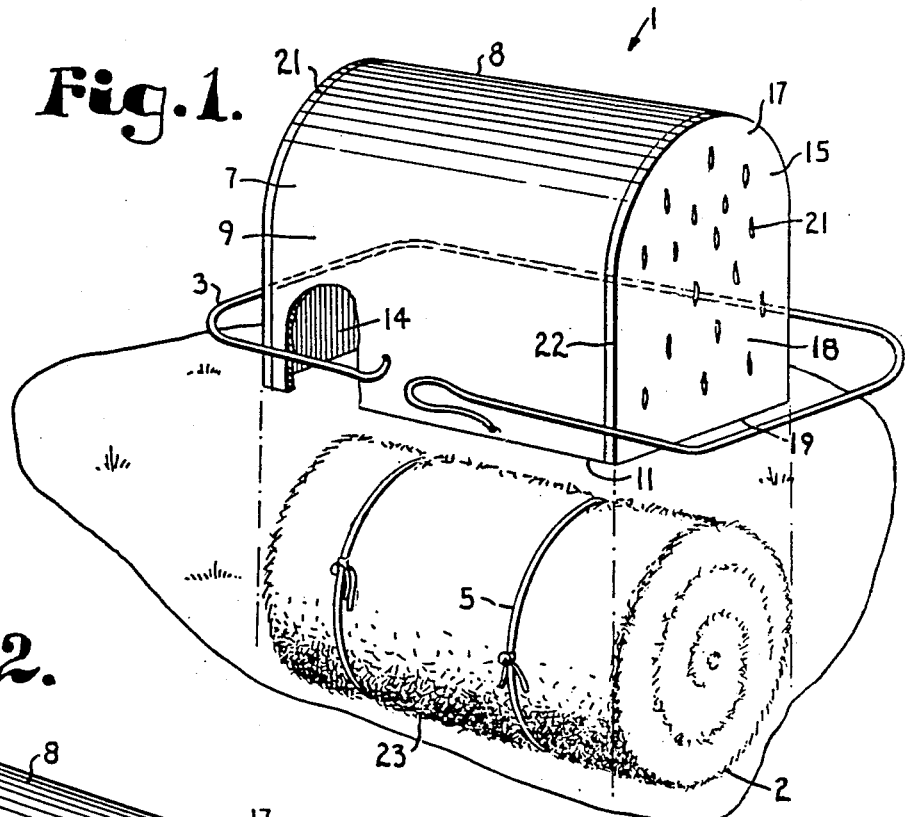
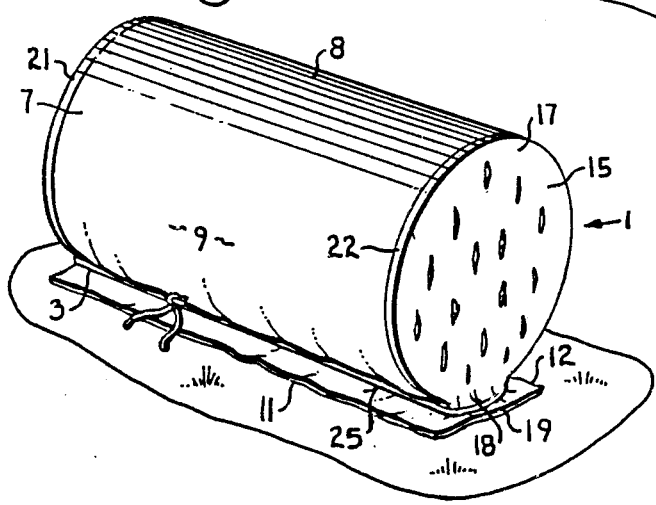
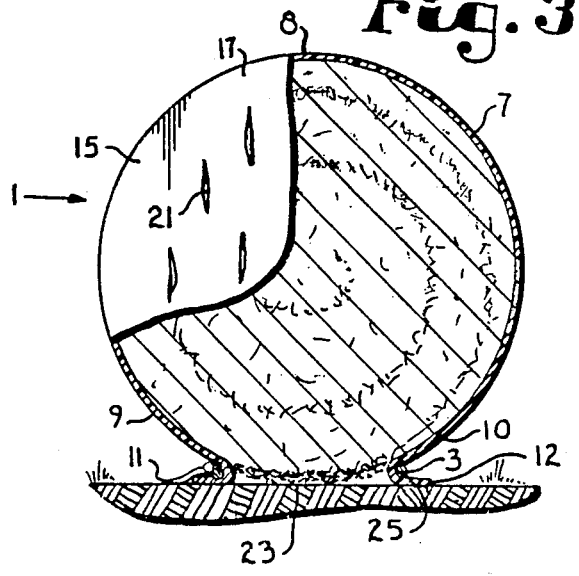

HAY BALE COVER

BACKGROUND OF THE INVENTION

This invention related to covers for straw, hay and the like and particularly to covers shaped to fit large round bales of such crops.

Bales of hay, when left in the cutting field or otherwise exposed to the weather, tend to rot and deteriorate, breaking apart and scattering the gathered hay over the field. Improved haying equipment has in recent years promoted gathering hay into large, cylindrical bales which may be as large as eight feet long by six feet in diameter and weigh as much as 1500 pounds. These bales cannot be lifted manually into a truck for transport and this has resulted in the proliferation of expensive new machines and devices designed specifically for lifting and transporting such large "round" bales as they are commonly called. Many farmers are unable to afford such transporting equipment and devices and thus leave the baled hay in the field and exposed to the weather.

Moreover, barns or enclosed buildings where the bales can be stored and protected from adverse weather are expensive to construct and the concentration of the bales tends to impose a high risk of loss of the entire hay crop in case of fire. Because of this, the need exists for a handy, easy to use, inexpensive bale cover that protects the bale from inclement weather conditions and tends to maintain the integrity of the bale in the field or other open area.

SUMMARY OF THE INVENTION

A cover for a cylindrical hay bale sized to cover a large hay bale comprising a sleeve member and opposite end members. The sleeve member has a first configuration and a second configuration. The sleeve member has an elongate semi-circular top portion and opposed side portions. The top portion has semi-circular edges at opposite ends thereof with each of the semi-circular edges having a common radius associated therewith.

Each of the side portions is attached at the top thereof to respective horizontal lower edges of the top portion. The side portions when in the first configuration extend vertically down from respective lower edges of the top portion and each of the side portions have a height substantially greater than the common radius. The side portions are sized such that when the sleeve member is placed in the first configuration wherein the cover is adapted to cover a hay bale having a radius substantially equal to the common radius, the top portion is adapted to cover the entire top of the bale and the side portions extend down so as to be engageable with a ground surface supporting the bale. The side portions in the second configuration are flexible and adapted to be tucked inwardly toward a bale being covered by the cover such that the side portions engage both the ground surface and the bale.

The end members each have an inverted U-shape periphery with an upper semi-circular edge thereof being directly connected with a respective semi-circular edge of the top portion and have lower side edges of equivalent length to respective edges of respective side portions and being connected therewith and further having a generally horizontal lower edge in the first configuration. Each of the end members being positioned to extend between respective semi-circular side and lower edges. The end members, top portion and the side portions forming an integral enclosure with only an open bottom when in the first configuration. The cover is made of a flexible and foldable, waterproof sheet material shaped to substantially enclose the cylindrical hay bale with a bottom thereof reposed on a supporting surface in the second configuration, whereby the cover is adapted to fit over the bale with the side portions and the end member lower portions tucked inwardly between the reposed bale bottom and the supporting surface to secure the cover in covering relation to the bale.

When the cover is tucked around the bale in the second configuration, a fold is formed around the bale and a tie is extended around the bale in the fold to securely hold the cover on the bale. A plurality of slits are located in the end members to allow air to circulate therethrough.--

OBJECTS OF THE INVENTION

The principal objects of the present invention are: to provide a hay bale cover which is adapted to fit a large cylindrical hay bale; to provide such a cover which protects the bale from inclement weather conditions and prevents the bale from breaking apart; to provide such a cover which is light in weight, reusable and easy to employ; to provide such a cover formed from durable plastic film; to provide such a cover which fits securely around a bale; to provide such a cover having a tie associated therewith for securing the cover around the bale; to provide such a cover having a plurality of openings therein which permit circulation of air into the area enclosed by the bale cover to aid in keeping the hay in a good condition; and to provide such a cover which is relatively inexpensive, highly reliable in use and well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an exploded perspective view illustrating a large cylindrical hay bale and a cover therefor embodying this invention, with portions of the cover broken away.

FIG. 2 is a perspective view showing the bale enclosed by the cover.

FIG. 3 is an end elevational view of the hay bale and cover, with portions broken away.

DETAILED DESCRIPTION OF THE INVENTION

As required, detailed embodiments of the present invention are disclosed herein; however, it is to be understood that the disclosed embdiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring more in detail to the drawings:

The reference numeral 1 generally indicates a hay bale cover embodying the present invention and shaped to conform generally to the configuration of a large, cylindrical hay bale 2 positioned thereunder, FIG. 1, particularly when lower portions of the cover are tucked under the bale. If desired to make a more secure cover, a tie 3 may be extended around a lower portion of the bale cover 1 to draw the bale cover 1 inwardly between a bottom surface of the hay bale 2 and the surface on which the bale rests to secure the cover 1 in substantially enclosing relation to the bale.

More specifically, certain modern hay harvesting machines for a large, cylindrical, hay bale 2 which is left in the field or other open areas after baling until needed for animal forage. Exposed to the effects of adverse weather conditions, the hay in the outer portions of the bales spoils or otherwise becomes unfit for feeding. Moreover, the hay may become soaked with moisture which increases the rate of deterioration. It may also mildew or rot, making the forage unfit for animal consumption. Nonetheless, the hay bale 2 is commonly left in the field whereby the farmer or rancher can avoid the expense of large storage enclosures, such as barns, and prevent the risk of loss of an entire hay crop by fire, tornado or other destructive means.

The cylindrical hay bale 2 may be up to approximately 8 feet long by 6 feet in diameter and weigh between 800 and 1500 pounds, depending on the type of hay material and moisture content thereof. The bale 2 is generally formed in a spiral or roll and is encircled by bailing wire or binder twine 5 to hold the bale 2 together.

The bale cover 1 is preferably formed of a relatively lightweight, waterproof, tough and durable material, such as polyethylene or similar plastic film material preferably of 3 to 5 mils in thickness. Such film material is commercially available in sheets or rolls for ease of fabrication. The bale cover 1 is easily foldable for compact storage and may be reused many times or even throughout several seasons as necessary.

The bale cover 1 has a central sleeve member 7 with a semicircular top margin or portion 8 generally extending the length of the bale 2 and opposite side margin or portions 9 and 10 extending generally downwardly therefrom. The side portions 9 and 10 are spaced laterally apart a distance approximately the diameter of the bale 2 to be covered, e.g., six feet apart for a six foot diameter bale. The side portions 9 and 10 are of a length to extend generally below the bale and terminate in respective bottom edges 11 and 12.

Opposite end members 14 and 15 close opposite ends of the cover 1, and in the illustrated example are in the form an inverted U-shape. Each end member 14 and 15 has a respective upper curved portion 17 connected to the semicircular top portion 8 of the sleeve member 7 and a lower portion 18 extending between the side portions 9 and 10 of the sleeve member 7. A respective end bottom edge 19 joins the side bottom edges 11 and 12 to complete a continuous peripheral edge around the bottom of the bale cover 1. The end members 14 and 15 are attached to the top portion 8 and side portions 9 and 10 by suitable means such as adhesives, heat welding or the like. Respective seams 21 and 22 are formed at the respective junctures thereof, forming a continuous seam or joinder whereby the top portion 8, side portions 9 and 10 of the sleeve number 7 and end members 14 and 15 provide an open bottom cover of a size to fit over a large round bale.

The tie 3, such as a rope, strong twine or the like, may be separate from or attached to the bale cover 1 adjacent the bottom edges 11, 12, and 19, in convenient placement to draw the bale cover 1 securely around the hay bale 2 and to protect the bale 2 from inclement weather conditions and prevent the bale 2 from breaking apart. Attaching the tie 3 to the cover 1 tends to assure a user of having same when applying the cover 1; however, a separate tie 3 may be applied to suitably secure the cover 1 around the bale 2. The tie 3 can be attached, or tacked, to the cover 1 at a point along the tie 3 by a suitable adhesive or the like. Alternatively, the bottom edges 11, 12, and 19 could be provided with a hem (not shown) having an interior duct through which the tie 3 passes.

In the illustrated example, the end members 14 and 15 include a plurality of openings such as slits 21 to provide circulation and admit air into the bale 2 to keep the hay in good condition; said slits are preferably arranged to extend vertically so rain is substantially excluded, but the bale cover permits air to pass through the slits particularly in response to temperature changes. If desired, the openings can be round or of essentially any shape.

In the employment of this invention, the cover 1 is situated over a reposed bale; that is, a bale 2 lying on a side 23 on the earth, or other surface, FIG. 1. The bale cover 1 is opened and the open bottom moved downwardly to position the cover over the hay bale 2. The side portions 9 and 10 and lower portions 18 are then forced or tucked inwardly around the bottom 23 of the hay bale 2 at the sides and ends to form a flap or fold 25 extending therearound. The flap or fold 25 is forced between the bottom 23 of the bale 2 and the ground or supporting surface on which the bale 2 is positioned so that the weight of the bale 2 on the flap or fold 25 and the ground or supporting surface tends to keep the cover 1 in enclosing relation to the bale 2.

If desired to make an even more secure cover, the tie 3 is preferably positioned in the flap or fold 25 and opposite ends of the tie are drawn together and secured to tighten the bale cover 1 on the hay bale 2, FIGS. 2 and 3. In either instance, the cover 1 substantially covers the hay bale, except for a portion of the bottom 23 remaining in contact with the ground surface. However, the fold or flap 25 engages between the bale and the ground or other support surface to resist entry of moisture into the bale.

The hay bale 2 is thus protected from inclement weather conditions such as high winds and rain that would otherwise tend to tear apart the bale and promote spoilage and rotting. The openings or slits 21 in the end members 14 and 15 provide air circulation, allowing the hay bale 2 to breathe in response to temperature and humidity changes.

Removing the bale cover 1 to feed the hay to livestock or otherwise use the bale 2 is relatively easily and quickly accomplished by untying the opposite ends of the tie 3 (if used) and lifting the cover 1 from the bale 2. The cover 1 can then be folded and stored for reuse.

It is to be understood that while certain forms of the present invention have been illustrated and described herein, it is not to be limited to the specific forms or arrangement of parts described and shown, except insofar as such limitations are included in the following claims.

What is claimed and desired to be secured by Letters Patent is as follows:

1. A cover for a cylindrical hay bale sized to cover a large hay bale comprising:
  (a) a sleeve member having a first configuration and a second configuration; said sleeve member having an elongate semi-circular top portion and opposed side portions; said top portion having semicircular edges at opposite ends thereof, each of said semi-circular edges having a common radius associated therewith; each of said side portions being attached at the top thereof to respective horizontal lower edges of said top portion; said side portions in said first configuration extending vertically down from respective lower edges of said top portion and each of said side portions having a height substantially greater than said common radius; said side portions being sized such that when said sleeve member is placed in said first configuration wherein said cover is adapted to cover a hay bale having a radius substantially equal to said common radius, said top portion is adapted to cover the entire top of the bale and said side portions extend down so as to be engageable with a ground surface supporting the bale; said side portions in said second configuration being flexible and adapted to be tucked inwardly toward a bale being covered by said cover such that the side portions engage both the ground surface and the bale; and
  (b) opposite end members each having an inverted U-shape periphery with an upper semi-circular edge thereof being directly connected with a respective semi-circular edge of said top portion and having lower side edges of equivalent length to respective edges of respective side portions and being connected therewith and further having a generally horizontal lower edge in said first configuration; each of said end members being positioned to extend between respective semicircular side and lower edges; said end members, said top portion and said side portions forming an integral enclosure with only an open bottom in said first configuration; said cover being made of a flexible and foldable, waterproof sheet material shaped to substantially enclose the cylindrical hay bale with a bottom thereof reposed on a supporting surface in second configuration, whereby said cover is adapted to fit over said bale with said side portions and said end member lower portions tucked inwardly between the reposed bale bottom and the supporting surface in covering relation to said bale.

2. The cover set forth in claim 1 wherein:
  (a) said side portions and said end member lower portions, when tucked inwardly of the reposed bottom of the bale, form a fold therearound; and including
  (b) a tie connected to said cover and extending around the bottom of said bale and received in said fold for drawing said cover securely over said bale.

3. The cover set forth in claim 1 including a plurality of openings in said end members for permitting circulation of air therethrough and around said bale.

4. The cover set forth in claim 3 wherein said openings are elongate slits substantially vertically disposed in said end members.

5. The cover according to claim 1 in combination with a large hay bale having a radius approximately equal to the radius of said cover top portion.

6. A cover in combination with a large cylindrical hay bale comprising:

(a) a sleeve member having a semi-circular top portion and opposed side portions extending generally downwardly from said top portion;
  (b) opposite end members having an inverted U-shape and being attached to opposite ends of said top portion and said side portions; said opposite end members having respective lower portions extending between and connecting said side portions at opposite ends of said cover; said cover being made of a flexible, waterproof sheet material shaped to substantially enclose the cylindrical hay bale with a bottom thereof reposed on a supporting surface, whereby said cover fits over said bale with said side portions and said end member lower portions tucked inwardly between the reposed bale bottom and the supporting surface to secure said cover in covering relation to said bale;
  (c) said side portions and said end member lower portions, when tucked inwardly of the reposed bottom of the bale, form a fold therearound; and including:
  (d) a tie connected to said cover and extending around the bottom of said bale when the bale is covered by said cover and received in said fold for drawing said cover securely over said bale.

7. The cover according to claim 6 wherein:
  (a) each of said members include a plurality of spaced, narrow and elongate slits to allow circulation of air therethrough.

8. A hay bale cover in combination with a hay bale comprising:
  (a) said cover being made of a durable, waterproof plastic film shaped to substantially enclose said large, cylindrical hay bale having a bottom thereof reposed on the ground;
  (b) a sleeve member having a semi-circular top portion with side portions extending generally downwardly therefrom and spaced apart a distance generally corresponding to and slightly larger than the diameter of the bale to be covered;
  (c) opposite end members having an inverted U-shape and being connected to said sleeve member top portion and having lower portions extending between and connected to opposite ends of said sleeve member side portions, whereby said cover covers said bale with said side and lower portions tucked inwardly between a reposed bottom of said bale and a supporting surface and forming a fold therearound;
  (d) a tie extending around the bottom of said bale and received in said fold for drawing said cover securely over said bale; and
  (e) a plurality of narrow, elongate slits substantially vertically disposed in said end members for permitting circulation of air therethrough to keep hay in said bale in good condition.

9. In combination with a generally cylindrical large bale reposed on a side in an open area on a supporting surface, a covering for the bale comprising:
  (a) a bale cover having a semi-cylindrical portion with side portions depending therefrom, and end portions with side and top margins secured to the adjacent edges of the semi-cylindrical portion and sides thereof; said depending sides being of a length to have lower portions folded against the supporting surface when the semi-cylindrical portion is resting on said cylindrical bale;

(b) said folded lower portions being movable to extend between said cylindrical bale and the supporting surface and engaged therebetween to substantially secure said cover to said cylindrical bale; and
(c) including said cover covering said bale and a tie being received in said folded lower portions and extending around said cover such that said cover is between said bale and the said tie and said tie is drawn snugly so as to hold said cover securely over said bale.

10. The combination set forth in claim 9 wherein said end portions have a plurality of narrow elongate slits substantially vertically disposed and extending therethrough for permitting exit and entrance of air to keep said bale in good condition.

* * * * *